United States Patent
Fant et al.

(10) Patent No.: US 6,931,206 B2
(45) Date of Patent: *Aug. 16, 2005

(54) ONE-TIME-USE CAMERA CONTAINING IMPROVED FILM ELEMENT

(75) Inventors: Alfred B. Fant, Rochester, NY (US); Yuangiao Rao, Pittsford, NY (US); Anthony L. Kaye, Stanmore (GB); Jehuda Greener, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,982

(22) Filed: Sep. 22, 2003

(65) Prior Publication Data

US 2005/0063690 A1 Mar. 24, 2005

(51) Int. Cl.⁷ .............................................. G03B 17/02
(52) U.S. Cl. ............................................ 396/6; 430/533
(58) Field of Search .............................. 396/6; 430/502, 430/533

(56) References Cited

U.S. PATENT DOCUMENTS

| | | |
|---|---|---|
| 4,141,735 A | 2/1979 | Schrader et al. |
| 4,827,298 A | 5/1989 | Sasaki et al. |
| 5,452,033 A | 9/1995 | Balling et al. |
| 6,558,884 B1 | 5/2003 | Greener et al. |

Primary Examiner—David M. Gray
(74) Attorney, Agent, or Firm—Chris K. Konkol (57) ABSTRACT

This invention contemplates a prepackaged photographic unit containing a photographic element comprising a transparent polyester film support with improved tongue retrieval performance and acceptable cutting performance in photofinishing equipment.

14 Claims, 1 Drawing Sheet

FIG. 1

ONE-TIME-USE CAMERA CONTAINING IMPROVED FILM ELEMENT

FIELD OF THE INVENTION

A prepackaged photographic unit containing a photographic film element comprising a transparent polyester film base provides low core-set and improved cutting characteristics.

BACKGROUND OF THE INVENTION

In silver-halide photography, there is a category of prepackaged photographic units, commonly called "film with lens" or "One-Time-Use Cameras" (OTUC's), wherein the consumer purchases a film element contained in a shell that incorporates a lens and shutter to sequentially expose frames of the film element. These OTUC's are purchased as a unit, used by the consumer, and returned by the consumer to a photofinishing laboratory for processing.

During manufacture of these units, the manufacturer preloads the film element in a cassette (also referred to as a cartridge or magazine), placing the tongue of the unexposed film element around a so-called supply-side spool in the dark and then pulling the film element from the cassette onto the spool leaving the end of the film attached to the spool in the cassette. In some OTUC's, the supply side spool is then removed, leaving the film tightly wound in the supply-side chamber. As the consumer exposes the film, the film is wound back into the cassette usually until all the frames are exposed. By constructing an OTUC in this fashion, the unit needs to have only one directional transport features and the cost is reduced.

Unlike conventional reloadable cameras used by consumers, the film element in a typical OTUC can spend several months with the tongue-end wound tightly into a roll, either onto the supply side spool or into a core-less spool of film. During this time, the tongue end of the film takes on core set, where the film acquires a tendency to stay coiled tightly, even when removed from the camera. The effect of core-set is particularly a problem with preloaded film in OTUC's because when preloaded the tongue of the film is held in a tighter diameter coil than in the original cartridge. This is especially true when the OTUC film element is a conventional 35 mm film comprising a cellulose tri acetate (CTA) film base. It is also especially a problem with increasingly smaller limited-size or narrow-bodied OTUC's or OTUC designs having relatively smaller diameter space for spooled or spool-less film. The high core-set curl makes it difficult for photofinishers to remove the tongue from the cassette to prepare the film for photo processing.

When a photographic film is wound on a spool it is likely to take up some core-set curl, the extent of which depends primarily on the diameter of the spool, the duration of winding (storage time) and the storage temperature. Because of the tendency to lower the size of film cartridges, hence decrease spool diameter, the problem of maintaining low core-set curl has become more acute.

The core-set propensity of the film is often measured under extreme conditions to simulate long storage times and adverse environmental conditions—the Accelerated Core-Set Test. Such tests are conducted by winding the film tightly around an actual spool and incubating the film at high temperature for a prescribed time, usually 1 day. The core-set realized in short-time, high-temperature tests simulates the core-set typically realized during actual use at room temperature and longer times. The wound film is then removed from the oven, allowed to equilibrate for some time at ambient conditions and its curl is measured according to Test Method A in American National Standard Institute (ANSI), P41.29-1985. The post-process curl (PPC) is evaluated by processing the film immediately after it is unwound from the spool in a standard minilab processor and measuring the residual curl of the processed film some prescribed time after the film exits the processor. Here too the curl is measured according to Test Method A in American National Standard Institute (ANSI), P41.29-1985.

Over the years many approaches have been taken to reduce core-set curl and/or post-process curl in photographic films. For example, U.S. Pat. No. 4,827,298 to Sasaki et al. provides film supports with superior anti-curl properties. Most approaches are associated with the film base, which normally makes the most significant contribution to the core-set curl produced by the film. These approaches can be generally divided into seven categories: (1) high-temperature annealing, (2) inherent curl, (3) ironing, (4) reverse winding, (5) addition of a restraining layer, (6) emulsion reformulation and (7) addition of moisture absorbing layers in a polyester laminate. Of these approaches, high temperature annealing is especially effective when dealing with relatively thick non-hydrophilic polyester film supports. General efforts in this regard have led to various base annealing procedures as described in U.S. Pat. Nos. 4,141,735; 5,254,445; 5,629,141 and 5,585,229. This material and other similar materials require relatively long annealing times to achieve sufficient reduction in core-set curl.

It would be desirable to utilize a film base with low core-set tendency in OTUC units. One such low core set tendency film exists in the Advanced Photo System format, poly(ethylene napthalate) or PEN. Such polyester film-base materials are well known in the trade. Both poly(ethylene napthalate) ("PEN"), and poly(ethylene terephthalate) base (PET) have been used as a film base. PEN film base has also been annealed (APEN) using a general procedure described in U.S. Pat. No. 4,141,735. Annealing temperatures used are generally in the range of from 50° C. to the glass transition temperature of the base material and for times ranging from 0.25–1000 hr.

APEN is very costly and very difficult to cut by photo-processing machines and other equipment used in a photo-processing laboratory for conventional 35 mm films comprising a CTA base. One attribute that expresses the difficulty to cut the base is the Cutting Index, defined below. Films with high Cutting Index values are harder to cut than those with Cutting Index values close to 1.0 (=value for CTA base).

U.S. Pat. No. 6,558,884 discloses a poly(ethylene terephthalate)-based photographic film base having improved properties with regard to cutting, perforating, and other finishing or photofinishing operations. The film base is made of a poly(ethylene terephthalate)-based material comprising a specified amount of monomeric units derived from 1,4-cyclohexanedimethanol, such that the film base has a specified cutting-related property.

PROBLEM TO BE SOLVED BY THE INVENTION

An object of this invention is to provide a photographic film element with low core-set tendency and low Cutting Index value that will be easy to remove from the cartridge of an OTUC and easy to cut in the photofinishing operation.

SUMMARY OF THE INVENTION

This invention relates to a prepackaged photographic unit containing a photographic film element comprising a transparent polyester film support with improved tongue retrieval performance and acceptable cutting performance in photo-finishing equipment. In particular, the invention is directed to a prepackaged photographic unit (one-time-use camera) containing a photographic film element which is pre-wound out of a cartridge housing onto a supply-side spool or into a (spool-less) supply-side chamber to form a supply-side roll (coil having a plurality of turns or series of concentric rings) of the film element wherein the leader (or tongue end) of the film element is stored at the center of the supply-side coil of the film element, the film element comprising a support and at least one light-sensitive silver-halide emulsion layer, said support comprising a CHDM-containing film base having simultaneously a characteristic core set of less than 60 m$^{-1}$ according to the OTUC core-set test and a "Cutting Index" of less than 2.0.

DETAILED DESCRIPTION OF THE INVENTION

With respect to the polyester material used in the film element that provides advantageous use in an OTUC, definitions of terms, as used herein, include the following:

By "terephthalic acid," suitable synthetic equivalents, such as dimethyl terephthalate, are included. It should be understood that "dicarboxylic acids" includes the corresponding acid anhydrides, esters and acid chlorides for these acids. Regarding the glycol/diol component or acid component in a polymer or material, the mol percentages referred to herein equal a total of 100 mol %.

"PET polymer," "PET resin," "poly(ethylene terephthalate) resin," and the like refers to a polyester comprising at least 98 mol % terephthalic-acid comonomer units, based on the total acid component, and comprising at least 98 mol % of ethylene-glycol comonomer units, based on the total glycol component. This includes PET resins comprising 100 mol % terephthalic-acid comonomer units, based on the total acid component, and comprising 100 mol % of ethylene-glycol comonomer units, based on the total glycol component.

The term "modified PET polymer," "modified PET resin," or the like is a polyester comprising at least 70 mol % terephthalic-acid comonomer units, based on the total acid component, that has been modified so that either the acid component is less than 98 mol % (including less than 95 mol %) of terephthalic-acid ("TA") comonomer units or the glycol component is less than 98 mol % (including less than 95 mol %) of ethylene glycol ("EG") comonomer units, or both the TA and EG comonomers units are in an amount less than 98 mol % (including less than 95 mol %). The modified PET polymer is modified with, or copolymerized with, one or more other types of comonomers other than terephthalic-acid comonomer and/or ethylene-glycol comonomers, in an amount of greater than 2 mol % % (including greater than 5 mol %) of either the acid component and/or the glycol component, for example, to improve the cuttability of a film base or otherwise change the properties of the film base in which it is used. The "modified PET resin" does not necessarily need to contain any ethylene glycol derived comonomer, and it does not necessarily need to contain any acid component other than terephthalic acid.

The term "CHDM-modified PET" or "CHDM-modified-PET polyester" or "CHDM-modified PET resin" refers to a modified-PET polymer modified by the inclusion of at least 65 mol % CHDM-comonomer units, based on the total glycol component.

Similarly, the term "CHDM-modified polyester" refers to a polyester comprising at least 65 mol % CHDM-comonomer units, based on total glycol component, but not necessarily comprising any specific amount of terephthalic-acid comonomer units.

The term "high-CHDM-modified PET" refers to a CHDM-modified PET polyester in which the level of CHDM-comonomer units is equal to or greater than 95 mol % (including 100 mol %). This includes both "PCT" (polycyclohexylene dimethylene terephthalate) and "PCTA," which is a copolymer of three monomers: terephthalic acid, isophthalic acid and 1,4-cyclohexane dimethanol, with 100 mol % of the 1,4-cyclohexane dimethanol based on its glycol component.

The term "high-CHDM-modified polyester" refers to a CHDM-modified polyester in which the level of CHDM-comonomer units is greater than 95 mol % (including 100 mol %), but not necessarily comprising any amount of terephthalic-acid comonomer units.

"PET-based-polyester material" is a material comprising one or more polymers wherein at least 70% by weight of the material is one or more modified PET polymers. Optionally, the materially may also include addenda such as silica beads, plasticizers, and the like.

The film base comprises a "PET-based-polyester material" in the present invention.

In one embodiment of the invention, a high-CHDM-modified PET resin is blended, using a suitable compounding method, with a polyester containing CHDM-comonomer units at a sufficient level. This resin is then used to prepare a biaxially stretched and heat-set film under conditions similar to those used for preparing PET film base. In another embodiment of this invention a modified-PET resin comprising CHDM comonomer at a sufficient level is used to prepare a biaxially stretched and heat-set film under conditions similar to those used for preparing PET film base. Typically, biaxially stretching the material causes amorphous material to become semicrystalline. In a typical embodiment, the crystallinity is at least 10%.

More particularly, the photographic film base used in the present process comprises a PET-based polyester material comprising one or more polyester resins, in which material the level of repeat units derived from 1,4-cyclohexane dimethanol (CHDM) is overall 65 to 100 mol %, based on total glycol component in the material. Preferably, the film base comprises a material in which the level of repeat units derived from 1,4-cyclohexane dimethanol is 70 to 100 mol %, based on total glycol component in the material.

In the case of a blend, the film base comprises a polyester material comprising a first polyester that is a high-CHDM-modified PET polymer that is blended with a second polyester, the second polyester comprising repeat units derived from 1,4-cyclohexane dimethanol such that the total repeat units derived from 1,4-cyclohexane dimethanol in the polyester materials is at a level between 65 to 100 mol % based on total glycol component in the polyester. All polyester materials in the blend must be miscible, that is, the film produced from said blend must be optically clear, to meet the stringent optical requirements of high transparency and low haze placed on photographic film bases.

More preferably, the repeat units derived from 1,4-cyclohexane dimethanol in the material are at a level of greater than 70, more preferably greater than 75 mol % based on total glycol component in the polyester.

In general, as is well known by the skilled artisan, polyesters comprise the reaction product of at least one dicarboxylic acid and at least one glycol component. The dicarboxylic acid component can typically comprise residues of terephthalic acid, isophthalic acid, 1,4-cyclohexanedicarboxylic acid, 2,6-naphthalenedicarboxylic acid, and/or mixtures thereof. Also suitable are the anhydrides thereof, acid chlorides thereof, and lower, e.g., C1–C8 alkyl esters thereof. Any isomers of the dicarboxylic acid component or mixtures thereof may be used. For example, cis, trans, or cis/trans mixtures of 1,4-cyclohexanedicarboxylic acid may be employed. Examples of suitable naphthalene dicarboxylic acid isomers include 1,4-naphthalenedicarboxylic acid, 2-6-naphthalenedicarboxylic acid, 2,7-naphthalenedicarboxylic acid or mixtures thereof.

In one embodiment, the CHDM-modified-PET polyesters used in the film base comprise copolyesters having a dicarboxylic acid component and a glycol component, the dicarboxylic acid component comprising repeat units from at least 80 mol % terephthalic acid (or its ester) and the glycol component comprising at least 65 mol %, preferably 70 to 100 mol %, of repeat units from 1,4-cyclohexane dimethanol and about 0 to 35 mol % from another glycol, preferably 5-30 mol % from ethylene glycol.

The CHDM-modified-PET polyesters used in making the articles of this invention preferably have about 100 mol % of a dicarboxylic acid portion and about 100 mol % of a glycol portion. Less than about 20 mol %, preferably not more than about 10 mol % of the dicarboxylic acid repeat units may be from other conventional acids such as those selected from succinic, glutaric, adipic, azelaic, sebacic, fumaric, maleic, itaconic, 1,4-cyclohexane-dicarboxylic, phthalic, isophthalic, and naphthalene dicarboxylic acid.

Preferably, the glycol component of the CHDM-modified-PET polyesters contains repeat units comprising from 65 to 100 mol % of 1,4-cyclohexane dimethanol and from about 0 to 35 mol % of ethylene glycol. The glycol component may optionally include less than 35 mol %, preferably not more than about 10 mol % of other conventional glycols such as propylene glycol, 1,3-propanediol; 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

In the case of embodiments involving blends, a blend comprising at least one high-CHDM-modified PET polymer blended with a suitable CHDM-modified polyester, such that the total content of the CHDM-comonomer units in the blend is 65 to 100 mol %, preferably at least 70 mol %, more preferably at least 75 mol %. In the CHDM-modified polyester, any of the above-mentioned acid components may be used and any of the above glycol components may be used in addition to the CHDM component.

Another embodiment of the invention involves annealing a film base comprising a PET-based polyester material comprising one or more polyester resins, in which material the level of repeat units derived from 1,4-cyclohexane dimethanol, based on the total glycol component, is 65 to 100 mol %, and the level of repeat units derived from an acid component other than terephthalic acid or its ester is in the amount of 3 to 30 mol %, preferably 5 to 20, based on the total acid component.

The acid component other than terephthalic acid can, for example, include isophthalic acid (IPA), dimethyl isophthalate, 1,4-cyclohexanedicarboxylic acid (1,4-CHDA), 1,4 cyclohexanediacetic acid, diphenyl-4,4-dicarboxylic acid, dimethyl-2,6-naphthalene-dicarboxylate, succinic acid, glutaric acid, adipic acid, azelaic acid, sebacic acid, paraphenylenedicarboxylic acid (PPDA), naphthalenedicarboxylic acid (NDA), and mixtures thereof. Preferably, the other acid component is isophthalic acid (IPA), 1,4-cyclohexanedicarboxylic acid (1,4-CHDA), paraphenylenedicarboxylic acid (PPDA), naphthalenedicarboxylic acid (NDA), and the like, and mixtures thereof.

Preferably, in one embodiment, a blend comprises a poly cyclohexanedimethylene terephthalate (PCT) polymer and a CHDM-modified polymer in the ratio of 95:5 to 5:95, more preferably 80:30 to 20:70. Preferably, the level of the CHDM-comonomer units in the CHDM-modified polymer is 65 to 95. Preferably, the blend comprises a poly cyclohexanedimethylene terephthalate (PCT) polymer and a CHDM-modified polymer in the ratio of 95:5 to 5:95. Preferably, the total content of the CHDM comonomer units in the CHDM-modified polymer is 65 to 95 mol %.

In one embodiment, a preferred CHDM-modified PET for use in the present invention is represented by the following structure:

In Structure (I) above, the subscripts x and y represent the mol %, based on the total glycol component of the comonomer. Preferably, as indicated above, x is 0 to 35 mol % and y is between 65 and 100 mol %, s is 0 to 30 mol % and r is 70 to 100 mol %. In one embodiment, "s" is at least 3 mol %, particularly when y is above 95 mol %. In another embodiment, y is 65 to 95 mol %.

The polyester polymers used in the present invention can be prepared by a process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system. An example of a preferred catalyst and inhibitor system is about 0–75 ppm Mn, about 50–150 ppm Zn, about 5–200 ppm Ge, about 5–20 ppm Ti and about 10–80 ppm P, all parts by weight based on the weight of the copolyester.

Either dimethyl terephthalate (or other lower dialkyl terephthalate ester) or terephthalic acid can be used in producing the copolyester. Thus, the term "terephthalic acid component, monomer, repeat unit, or portion" herein is meant to include either the acid or ester form. These materials are commercially available. The glycols CHDM and ethylene glycol are also commercially available. Either the cis or trans isomer of CHDM, or mixture thereof, may be used in accordance with the present invention.

Generally, the copolyesters may be produced using conventional polyesterification procedures described, for example, in U.S. Pat. Nos. 3,305,604 and 2,901,460, the disclosures of which are incorporated herein by reference. The amorphous or semi-crystalline copolyesters according to the invention are prepared by conventional polymerization processes known in the art, such as disclosed by U.S. Pat. Nos. 4,093,603 and 5,681,918, the disclosures of which are herein incorporated by reference. Examples of polycondensation processes useful in making the PET material of the present invention include melt phase processes conducted with the introduction of an inert gas stream, such as nitrogen, to shift the equilibrium and advance to high molecular weight or the more conventional vacuum melt phase polycondensations, at temperatures ranging from about 240° C. to about 300° C. or higher, which are practiced commercially. Although not required, conventional additives may be added to the copolyester materials of the invention in typical amounts. Such additives include pigments, colorants, stabilizers, antioxidants, extrusion aids, slip agents, carbon black, flame retardants and mixtures thereof.

Various modified-PET polyesters of the present invention comprising repeat units derived from CHDM are commercially available from Eastman Chemical Company (Kingsport, Tenn.) under the trademark EASTAPAK and EASTAR copolyesters.

The polyester film base of said support may be manufactured by a process of casting, biaxial stretching, and heat setting. The process for making PET film base typically comprises the steps of casting a molten PET resin onto a casting surface along the machine direction to form a continuous sheet, drafting the sheet by stretching in the machine direction, tentering the sheet by stretching in the transverse direction, heat setting the drafted and tentered sheet, and cooling the heat-set sheet to form a stretched, heat-set PET film. The conventional aspects of this process are such as described in, e.g., U.S. Pat. No. 4,141,735 to Schrader et al., the disclosure of which is incorporated in its entirety by reference herein. Alternately, the stretching of the film in the machine and transverse directions can be performed simultaneously using appropriate machinery.

In one particular embodiment, the process for preparing films from the resin compositions of this invention comprises the following steps:

(1) The resin is cast under molten conditions upon a cooling surface to form a continuous cast sheet. Preferably, the molten polyester resin has an inherent viscosity of from 0.5 to 0.8 dl/g, and is cast at a temperature of from 250 to 310° C. while the casting surface has a temperature of from 40 to 70° C. The inherent viscosity (IV) is measured at 25° C. in a solvent mixture of phenol/chlorobenzene (60/40 by weight) at a concentration of 0.25 g/dl with aUbbelhode glass viscometer.

(2) The continuous sheet is removed from the casting surface and passed into a drafting zone where it is first preheated and then stretched in the machine direction at a stretch ratio of 2.0 to 4.0, at a temperature of from about 80° C. to 120° C. The drafting zone typically includes two sets of nipped rollers, the first being the entrance to the drafting zone and the second the exit from the drafting zone. To achieve the stretch ratios necessary for the practice of this invention, the exit nip rollers are rotated at a speed greater than the entrance nip rollers. The film may be cooled in the last stage of the drafting zone to 25° C. to 60° C.

(3) The film moves from the drafting zone into a tentering zone where it is preheated and stretched in the transverse direction at a stretch ratio of 2.0 to 4.0, at a temperature of from about 80° C. to 130° C. The tentering zone typically includes a means for engaging the film at its edges and stretching such that the final width is from 2.0 to 4.0 times that of the original width.

(4) The film is next heat set by maintaining it at a temperature of at least 160° C., but below the melting point of the resin, preferably at the range of from 180° C. to 250° C., while being constrained, as in the tentering zone, for a time sufficient to affect heat-setting. Times longer than necessary to bring about this result are not detrimental to the film; however, longer times are undesired as the lengthening of the zone requires higher capital expenditure without achieving additional advantage. The heat-setting step is typically accomplished within a time period of 0.1 to 15 seconds and preferably 0.1 to 10 seconds. Finally, the film is cooled without substantial detentering (the means for holding the edges of the film do not permit greater than 2% shrinkage thereof). In some cases, it may be advantageous to employ a relatively low heat-set temperature range of 160 to 200° C., as described in copending, commonly assigned U.S. Ser. No. 10/279,891 hereby incorporated by reference.

Typically following the heat setting of the film base and the addition of other support layers prior to emulsion coating, the support is wound on a core for temporary storage and it is then annealed under appropriate conditions. The support can be annealed as a wound roll or it can be unwound for in-line annealing. In-line annealing can be done immediately following heat setting of the film base. Typical annealing conditions comprise temperatures of from 50° C. up to Tg+15° C. for times of up to 1000 hrs, where Tg is the glass transition temperature of the unprocessed amorphous resin. In some cases, it may be advantageous to employ a relatively shorter annealing times of less than 6 minutes, as described in copending, commonly assigned U.S. Ser. No. 10/633,183 hereby incorporated by reference. Following annealing, the support is typically rewound for later transport to the emulsion coating operation.

As indicated above, the support of the present invention can contain other components, in addition to the film base, commonly found in film supports for photographic elements. These include dyes, lubricants and particles of organic or inorganic materials such as glass beads, filler particles, magnetic particles and antistatic agents. These are described in more detail in *Research Disclosure*, February 1995, Item 37038, pages 79–114 and *Research Disclosure*, September 1996, Item 38957, pages 591–639.

The film base can bear layers commonly found on film support used for photographic elements. These include magnetic layers, subbing layers between other layers and the support, photosensitive layers, interlayers and overcoat layers, as are commonly found in photographic elements. These layers can be applied by techniques known in the art and described in the references cited in *Research Disclosure*, Item 37038 cited above.

Magnetic layers that can be used in photographic elements of this invention are described in U.S. Pat. Nos. 3,782,947; 4,279,975; 5,147,768; 5,252,441; 5,254,449; 5,395,743; 5,397,826; 5,413,902; 5,427,900; 5,432,050; 5,434,037; 5,436,120; in *Research Disclosure*, November 1992, Item 34390, pages 869. and in Hatsumei Kyonkai Gihou No. 94-6023, published Mar. 15, 1995, by Hatsumei Kyoukai, Japan.

Subbing layers are used for the purpose of providing an adhesive force between the polyester support and an overlying photographic emulsion comprising a binder such as gelatin, because a polyester film is of a very strongly hydrophobic nature and the emulsion is a hydrophilic colloid. If the adhesion between the photographic layers and the support is insufficient, several practical problems arise such as delamination of the photographic layers from the support at the cut edges of the photographic material, which can generate many small fragments of chipped-off emulsion layers, which then cause spot defects in the imaging areas of the photographic material.

Various subbing processes and materials have, therefore, been used or proposed in order to produce improved adhesion between the support film and the hydrophilic colloid layer. For example, a photographic support may be initially treated with an adhesion promoting agent such as, for example, one containing at least one of resorcinol, catechol, pyrogallol, 1-naphthol, 2,4-dinitro-phenol, 2,4,6-trinitrophenol, 4-chlororesorcinol, 2,4-dihydroxy toluene, 1,3-naphthalenediol, 1,6-naphthalenediol, acrylic acid, sodium salt of 1-naphthol-4-sulfonic acid, benzyl alcohol, trichloroacetic acid, dichloroacetic acid, o-hydroxybenzotrifluoride, m-hydroxybenzotrifluoride, o-fluorophenol, m-fluorophenol, p-fluorophenol, chloralhydrate, and p-chloro-m-cresol. Polymers are also known and used in what is referred to as a subbing layer for promoting adhesion between a support and an emulsion layer. Examples of suitable polymers for this purpose are disclosed in U.S. Pat. Nos. 2,627,088; 2,968,241; 2,764,520; 2,864,755; 2,864,756; 2,972,534; 3,057,792; 3,071,466; 3,072,483; 3,143,421; 3,145,105; 3,145,242; 3,360,448; 3,376,208; 3,462,335; 3,475,193; 3,501,301; 3,944,699; 4,087,574; 4,098,952; 4,363,872; 4,394,442; 4,689,359; 4,857,396; British Patent Nos. 788,365; 804,005; 891,469; and European Patent No. 035,614. Often these include polymers of monomers having polar groups in the molecule such as carboxyl, carbonyl, hydroxy, sulfo, amino, amido, epoxy or acid anhydride groups, for example, acrylic acid, sodium acrylate, methacrylic acid, itaconic acid, crotonic acid, sorbic acid, itaconic anhydride, maleic anhydride, cinnamic acid, methyl vinyl ketone, hydroxyethyl acrylate, hydroxyethyl methacrylate, hydroxychloropropyl methacrylate, hydroxybutyl acrylate, vinylsulfonic acid, potassium vinylbenezensulfonate, acrylamide, N-methylamide, N-methylacrylamide, acryloylmorpholine, dimethylmethacrylamide, N-t-butylacrylamide, diacetonacrylamide, vinylpyrrolidone, glycidyl acrylate, or glycidylmethacrylate, or copolymers of the above monomers with other copolymerizable monomers. Additional examples are polymers of, for example, acrylic acid esters such as ethyl acrylate or butyl acrylate, methacrylic acid esters such as methyl methacrylate or ethyl methacrylate or copolymers of these monomers with other vinylic monomers; or copolymers of polycarboxylic acids such as itaconic acid, itaconic anhydride, maleic acid or maleic anhydride with vinylic monomers such as styrene, vinyl chloride, vinylidene chloride or butadiene, or trimers of these monomers with other ethylenically unsaturated monomers. Materials used in adhesion-promoting layers often comprise a copolymer containing a chloride group such as vinylidene chloride.

The support of the present invention may be treated with corona discharge (CDT), UV, glow discharge (GDT), flame or other such methods that enhance adhesion of the support surface. The preferred method is the glow discharge treatment as described in U.S. Pat. No. 5,425,980 incorporated herein by reference.

As indicated above, the support comprising the film base is used in a photographic element comprising at least one silver-halide imaging layer over a support comprising a film base. Such a photographic element can be a photographic film or a photothermographic film. In a particularly preferred embodiment, the photographic elements of this invention is a photographic film in which the image-forming layer is a radiation-sensitive silver halide emulsion layer. Such emulsion layers typically comprise a film-forming hydrophilic colloid, the most commonly used of these being gelatin or gelatin derivatives as will be understood by the skilled artisan. Still other useful hydrophilic colloids are water-soluble polyvinyl compounds such as polyvinyl alcohol, polyacrylamide, poly(vinylpyrrolidone), and the like.

The photographic elements of the present invention can be simple black-and-white or monochrome elements comprising a support bearing a layer of light-sensitive silver halide emulsion or they can be multilayer and/or multicolor elements.

Color photographic elements of this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

A preferred photographic element according to this invention comprises a support bearing at least one blue-sensitive silver halide emulsion layer having associated therewith a yellow image dye-providing material, at least one green-sensitive silver halide emulsion layer having associated therewith a magenta image dye-providing material and at least one red-sensitive silver halide emulsion layer having associated therewith a cyan image dye-providing material. In addition to emulsion layers, the elements of the present invention can contain auxiliary layers conventional in photographic elements, such as overcoat layers, spacer layers, filter layers, interlayers, antihalation layers, pH lowering layers (sometimes referred to as acid layers and neutralizing layers), timing layers, opaque reflecting layers, opaque light-absorbing layers and the like. Details regarding other layers of the photographic elements of this invention are contained in *Research Disclosure*, Item 36544, September 1994. Photographic elements in accordance with this invention can have the structure and components shown in *Research Disclosures*, Items 37038 and 38957 and can be imagewise exposed and processed using known techniques and compositions, including those described in the *Research Disclosures* Items 37038 and 38957 cited above.

The light-sensitive silver halide emulsions employed in the photographic elements of this invention can include coarse, regular or fine grain silver halide crystals or mixtures thereof and can be comprised of such silver halides as silver chloride, silver bromide, silver bromoiodide, silver chlorobromide, silver chloroiodide, silver chorobromoiodide, and mixtures thereof. The emulsions can be, for example, tabular grain light-sensitive silver halide emulsions. The emulsions can be negative-working or direct positive emulsions. They can form latent images predominantly on the surface of the silver halide grains or in the interior of the silver halide grains. They can be chemically and spectrally sensitized in accordance with usual practices. The emulsions typically will be gelatin emulsions although other hydrophilic colloids can be used in accordance with usual practice. Details regarding the silver halide emulsions are contained in *Research Disclosure*, Item 36544, September, 1994, and the references listed therein.

The photographic silver halide emulsions utilized in this invention can contain other addenda conventional in the photographic art. Useful addenda are described, for example, in *Research Disclosure*, Item 36544, September, 1994. Useful addenda include spectral sensitizing dyes, desensitizers, antifoggants, masking couplers, DIR couplers, DIR compounds, antistain agents, image dye stabilizers, absorbing materials such as filter dyes and UV absorbers, light-scattering materials, coating aids, plasticizers and lubricants, and the like.

Depending upon the dye-image-providing material employed in the photographic element, it can be incorporated in the silver halide emulsion layer or in a separate layer associated with the emulsion layer. The dye-image-providing material can be any of a number known in the art, such as dye-forming couplers, bleachable dyes, dye developers and redox dye-releasers, and the particular one employed will depend on the nature of the element, and the type of image desired.

Dye-image-providing materials employed with conventional color materials designed for processing with separate solutions are preferably dye-forming couplers; i.e., compounds which couple with oxidized developing agent to form a dye. Preferred couplers which form cyan dye images are phenols and naphthols. Preferred couplers which form magenta dye images are pyrazolones and pyrazolotriazoles. Preferred couplers which form yellow dye images are benzoylacetanilides and pivalylacetanilides.

The photographic processing steps to which the exposed film may be subject may include, but are not limited to the following:
1) color developing→bleach-fixing→washing/stabilizing;
2) color developing→bleaching fixing→washing/stabilizing;
3) color developing→bleaching-bleach→fixing washing/stabilizing;
4) color developing→stopping→washing→bleaching→washing→fixing→washing/stabilizing;
5) color developing→bleach-fixing→fixing→washing/stabilizing;
6) color developing bleaching→bleach-fixing→fixing washing/stabilizing;

Among the processing steps indicated above, the steps 1), 2), 3), and 4) are preferably applied. Additionally, each of the steps indicated can be used with multistage applications as described in Hahm, U.S. Pat. No. 4,719,173, with co-current, counter-current, and contraco arrangements for replenishment and operation of the multistage processor.

Any photographic processor known to the art can be used to process the photosensitive materials described herein. For instance, large volume processors, and so-called minilab and microlab processors may be used. Particularly advantageous would be the use of Low Volume Thin Tank processors as described in the following references: WO 92/10790; WO 92/17819; WO 93/04404; WO 92/17370; WO 91/19226; WO 91/12567; WO 92/07302; WO 93/00612; WO 92/07301; WO 02/09932; U.S. Pat. No. 5,294,956; EP 559,027; U.S. Pat. No. 5,179,404; EP 559,025; U.S. Pat. No. 5,270,762; EP 559,026; U.S. Pat. Nos. 5,313,243; 5,339,131.

The present invention is also applicable to digital film processing (DFP). DFP systems directly scan the film during the development process. In particular, instead of scanning the dye image in the film, conventional DFP systems scan the silver image formed in the emulsion layers while the film is developing. An example of such a digital color dye film processing system for developing and scanning silver is described in U.S. Pat. No. 6,505,977, hereby incorporated by reference.

Optionally, the processed element may be re-introduced into the cassette, for example, as disclosed in published European Patent Application 0 476 535 A1 describes how the developed film may be stored in such a cassette.

The one-time-use cameras employed in this invention can be any of those known in the art. These cameras can provide specific features as known in the art such as shutter means, film winding means, film advance means, waterproof housings, single or multiple lenses, lens selection means, variable aperture, focus or focal length lenses, means for monitoring lighting conditions, means for adjusting shutter times or lens characteristics based on lighting conditions or user provided instructions, and means for camera recording use conditions directly on the film. These features include, but are not limited to: providing simplified mechanisms for manually or automatically advancing film and resetting shutters as described at Skarman, U.S. Pat. No. 4,226,517; providing apparatus for automatic exposure control as described at Matterson et al, U S. Pat. No. 4,345,835; moisture-proofing as described at Fujimura et al, U.S. Pat. No. 4,766,451; providing internal and external film casings as described at Ohmura et al, U.S. Pat. No. 4,751,536; providing means for recording use conditions on the film as described at Taniguchi et al, U.S. Pat. No. 4,780,735; providing lens fitted cameras as described at Arai, U.S. Pat. No. 4,804,987; providing a viewfinder as described at Ohmura et al, U.S. Pat. No. 4,812,863; providing a lens of defined focal length and lens speed as described at Ushiro et al, U.S. Pat. No. 4,812,866; providing multiple film containers as described at Nakayama et al, U.S. Pat. No. 4,831,398 and at Ohmura et al, U.S. Pat. No. 4,833,495; providing films with improved anti-friction characteristics as described at Shiba, U.S. Pat. No. 4,866,469; providing winding mechanisms, rotating spools, or resilient sleeves as described at Mochida, U.S. Pat. No. 4,884,087; providing a film patrone or cartridge removable in an axial direction as described by Takei et al at U.S. Pat. Nos. 4,890,130 and 5,063,400; providing an electronic flash means as described at Ohmura et al, U.S. Pat. No. 4,896,178; providing an externally operable member for effecting exposure as described at Mochida et al, U.S. Pat. No. 4,954,857; providing film support with modified sprocket holes and means for advancing said film as described at Murakami, U.S. Pat. No. 5,049,908; providing internal mirrors as described at Hara, U.S. Pat. No. 5,084,719; and providing silver-halide emulsions suitable for use on tightly wound spools as described at Yagi et al, European Patent Application 0,466,417 A.

While the film may be mounted in the one-time-use camera in any manner known in the art, one embodiment involves mounting the film in the one-time-use camera such that it is taken up on exposure by a thrust cartridge. Thrust cartridges are disclosed by Kataoka et al U.S. Pat. No. 5,226,613; by Zander U.S. Pat. No. 5,200,777; by Dowling et al U.S. Pat. No. 5,031,852; and by Robertson et al U.S. Pat. No. 4,834,306. A second embodiment involves a so-called 35 mm (also referred to as a 135 type) cartridge. Narrow bodied one-time-use cameras suitable for employing thrust cartridges in this way are described by Tobioka et al U.S. Pat. No. 5,692,221. More generally, the size limited cameras most useful as one-time-use cameras will be generally rectangular in shape and can meet the requirements of easy handling and transportability in, for example, a pocket, when the camera as described herein has a limited volume. The camera should have a total volume of less than about 450 cubic centimeters (cc's), preferably less than 380 cc, more preferably less than 300 cc, and most preferably less than 220 cc. The depth-to-height-to-length proportions of such a camera will generally be in an about 1:2:4 ratio, with a range in each of about 25% so as to provide comfortable handling and pocketability. Generally the minimum usable depth is set by the focal length of the incorporated lens and by the dimensions of the incorporated film spools and cartridge. The camera will preferably have the majority of corners and edges finished with a radius-of-curvature of between about 0.2 and 3 centimeters.

While any known taking lens may be employed in the cameras of this invention, the taking lens mounted on the single-use cameras of the invention are preferably single aspherical plastic lenses. The lenses will have a focal length between about 10 and 100 mm, and a lens aperture between f/2 and f/32. The focal length is preferably between about 15 and 60 mm and most preferably between about 20 and 40 mm. For pictorial applications, a focal length matching to within 25% the diagonal of the rectangular film exposure area is preferred. Lens apertures of between f/2.8 and f/22 are contemplated with a lens aperture of about f/4 to f/16 being preferred. The lens MTF can be as low as 0.6 or less at a spatial frequency of 20 lines per millimeter (1 pm) at the film plane, although values as high as 0.7 or most preferably 0.8 or more are contemplated. Higher lens MTF values generally allow sharper pictures to be produced. Multiple lens arrangements comprising two, three, or more component lens elements consistent with the functions described above are specifically contemplated.

Single use camera and their methods of manufacture and use are described in U.S. Pat. Nos. 4,801,957; 4,901,097; 4,866,459; 4,849,325; 4,751,536; 4,827,298; all of which are incorporated herein by reference. Cameras may contain a built-in processing capability, for example a heating element. Designs for such cameras including their use in an image capture and display system are disclosed in U.S. patent application Ser. No. 09/388,573 filed Sep. 1, 1999, incorporated herein by reference. The use of a one-time use camera as disclosed in said application is particularly preferred in the practice of this invention.

Figure 1:
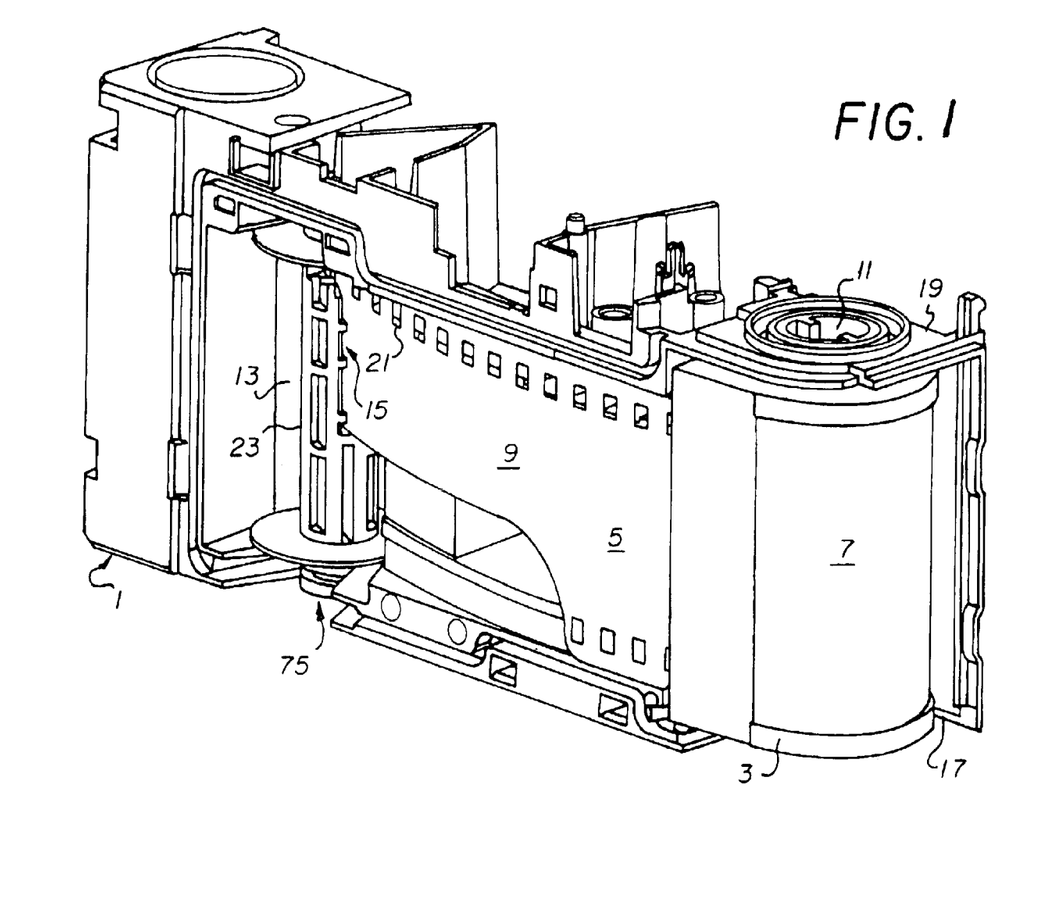
FIG. 1 is a schematic, open back view of one embodiment or model of an OTUC unit containing a photographic film in accordance with the present invention.

FIG. 1 depicts the leader 9 in the position either before the pre-wind operation or just before the filmstrip is fully rewound back into the cartridge housing 7. In the former case, the leader 9 has been slipped into the slit 15 such that the engagement facilitates the pre-wind operation.

In one embodiment of a single-use camera, a light-tight, plastic camera body is formed of a front cover, back cover, top, film door and camera frame. FIG. 1 is a perspective rear view of the camera frame 1 with a film cartridge 3 inserted in position and with the filmstrip leader 9 engaged in the slit 15 of a takeup spool 13. FIG. 1 does not depict the other components of the camera frame or mechanism, but it will be understood that the other components, except for the rear cover and film door, can be assembled together in practice before the film cartridge 3 and the takeup spool 13 is inserted into the camera frame 1 as shown. See for example, U.S. Pat. No. 5,452,033 hereby incorporated by reference in its entirety.

A film cartridge is enclosed within the camera body, specifically supported within the camera frame 1 depicted in FIG. 1, so that the filmstrip 5 extends across an exposure gate rear baffle (not shown) and is attached at its leader 9 in a slit in takeup spool 13 or (during use, supply side spool) in a manner to be described. The filmstrip is pre-wound out of the cartridge housing 7 and wound around the takeup spool 13. A thumbwheel (not shown) fits into the cartridge spool 11 when the components are assembled, so that the user may wind the thumbwheel to advance the filmstrip an image frame at a time back into the cartridge housing 7. The initial pre-winding or withdrawal of filmstrip 5 out of cartridge 3 and onto takeup spool 13 is accomplished during initial assembly or recycling of the package by the use of a tapered defeat pin inserted through an opening in a top cover (not shown). By a conventional mechanism as will be familiar to the skilled artisan, filmstrip 5 is allowed to be drawn from cartridge housing 7 and into a roll on takeup spool 13. An automatic pre-wind device like a powered screwdriver (not shown) meshes with an end slot of takeup spool 13 to rotate it clockwise (as viewed from above). Typically, the pre-wind process continues until most of the filmstrip 5 has been wound on takeup spool 13, and the tape which attaches the end of filmstrip 5 to cartridge spool 11 is pulled partially through the cartridge slot. The prewind drive is then disengaged from the takeup spool 13.

As also shown in FIG. 1, the cartridge housing 7 fits in a receptacle 17 formed at the other end of the camera frame 1 with the cartridge spool 11 extending through an opening in the upper frame member 19. When positioned as shown in FIG. 1, the cartridge 3 is locked in place by snapping a rear cover and the film door together over the camera frame 1. Once all of the components of the camera are assembled, the filmstrip 5 may be pre-wound into a roll around the hollow shaft 23 as described above and rotating the drive end 25, which is accessible through the bottom of the camera frame 1. The camera shutter and rewind operations can be tested by making a test exposure of the first image frame, and successfully tested camera mechanisms are then packaged. Then, as the camera is used, the filmstrip 5 having a series of engaging perforations 21 is wound back into the cartridge housing 7 an image frame at a time.

Photographic film elements of the present invention are preferably imagewise exposed using any of the known techniques, including those described in *Research Disclosure* I, Section XVI. This typically involves exposure to light in the visible region of the spectrum, and typically such exposure is of a live image through a lens. Exposures are monochromatic, orthochromatic, or panchromatic depending upon the spectral sensitization of the photographic silver halide. As mentioned above, single use cameras (or "film with lens" units) are sold with the photographic film element preloaded in them and the entire camera is returned to a processor with the exposed film remaining inside the camera.

Referring now to FIG. 1, a schematic, open back view of one model of an OTUC unit is shown. During manufacture of these units, the manufacturer preloads the film element, placing the tongue (10) of the unexposed film (5) around a so-called supply-side spool (20) in the dark and pulling the film (5) from the cartridge or cassette (30) onto the spool leaving the end of the film attached to the spool (40) in the cassette. In some OTUC's the supply side spool is then removed, leaving the film tightly wound in the supply-side chamber. As the consumer exposes the film, the film is wound back into the cassette until all the frames are exposed. By constructing the OTUC in this fashion, the unit needs to have only one directional transport features and cost is reduced.

Since the film in a standard 35 mm photo-processing operation undergoes many cutting steps, e.g., during minilab processing, in splicing and in film finishing, it is important that the cutting performance of any new film base for 35 mm films be similar to that of CTA. The cutting performance of the film can be conveniently represented by a quantity referred to as the Cutting Index. Since it is generally known in the art of sheet material cutting that the cutting process combines crack formation and propagation, to evaluate the cutting performance of a given material one needs to examine how the material behaves during the crack formation and propagation stages. If the material absorbs and dissipates more mechanical energy during the crack formation and propagation processes, it is said to be more difficult to cut and will have poorer cutting.

Two standard tests can be used to evaluate how much mechanical energy a material absorbs and dissipates during the crack formation and propagation steps. One is the tensile test (ASTM D882-80a) and the other is the tear test (ASTM D1938). The former can be used to evaluate the crack formation part of the cutting process, and the latter can be used to assess the crack propagation part of the cutting process.

A tensile test consists of pulling a sample of material with a tensile load at a specified rate until it breaks. The test sample used may have a circular or a rectangular cross section. From the load and elongation history, a stress-strain curve is obtained with the strain being plotted on the x-axis and stress on the y-axis. The tensile toughness is defined as the area under the entire stress-strain curve up to the fracture point.

The tear resistance, as determined using ASTM-D 1938 (the Trouser Tear Test), measures the force to propagate tearing. The test sample used has a rectangular shape and a sharp long cut in the middle. The separated two arms are then fixed in a conventional testing machine such as Instron®. The fixtures move at constant speed to prolong the preexisting cut and the steady state force of tearing, $P_c$, is recorded.

The Cutting Index can be defined based on the tensile toughness and tear resistance. Tensile toughness can be evaluated through tensile testing. Fracture toughness $G_c$ can be calculated from the Trouser Tear strength based on the following equation (1):

$$G_c = 2P_c/b \qquad (1)$$

where $P_c$ is defined above and b is the specimen thickness. (See Rivlin, R. S. & Thomas, A. G., (1953), J. Polym. Sci., 10, 291).

For practical simplicity, a dimensionless quantity of Cutting Index is defined as follows, $$C = 0.5 W_t/W_{tr} + 0.5 G_c/G_{cr} \qquad (2)$$

where C is the cutting index, $W_t$ is tensile toughness and $G_c$ is fracture toughness, and $W_{tr}$ and $G_{cr}$ are the corresponding properties of a reference material, where CTA is selected as the reference material of this invention. The Cutting Indices of commonly used film base materials such as PET, PEN and CTA correspond well to their practical cutting performance. Generally, it is desirable for C to be close to 1 (CTA value).

The present invention is described in greater detail below by referring to the Examples. However, the present invention should not be construed as being limited thereto.

EXAMPLES

Materials:

Various polyester film bases were prepared and tested for this invention along with a conventional CTA film base (currently used in 35 mm, also referred to as 135 type etc. type OTUC's). The polyester film bases include annealed EASTAR Copolyester A150® (this invention), annealed Poly(ethylene napthalate) (APEN) (comparative), and annealed poly(ethylene terephthalate) base (APET) (comparative). EASTAR Copolyester A150® (Trademark of Eastman Chemical Company, USA) is a high CHDM poly (ethylene terephthalate)-based resin. This resin is a copolyester comprising three monomers: terephthalic acid, isophthalic acid and CHDM with 100 mol % of 1,4-cyclohexane dimethanol as its diol component, and approximately 17 mol % of isophthalic acid and 83 mol % of terephthalic acid as its diacid components. Its glass transition temperature is 89° C. (as unprocessed amorphous resin). The tensile toughness, tear strength and core-set curl of the various films were measured in accordance with procedures described below.

Test Measurements:

Core-set: Three lengthwise strips 75 mm×15 mm were cut along the machine direction and equilibrated at 23° C./50% RH for 16 hr. The strips were then wound on 10.8 mm-diameter plastic cores and stored for 24 hrs in a moisture-proof bag at 55° C. to simulate long storage times. After incubation, the films were removed from the bag and allowed to equilibrate at 23° C./24 hrs for at least 16 hrs. The films were finally unwound and allowed to form unrestricted coils. The curl (curvature) of the unwound films was measured in accordance with Test Method A in ANSI P41.29-1985. This test will be referred to herein as the OTUC core-set test.

Tensile Test: All tests were performed in accordance with the ASTM D 882-80a in a standard environment of 50% RH and 23° C. The tensile test was conducted using a Sintech 2 operated via TESTWORK version 4.5 software with an INSTRON frame and load cell. A load cell of 200 lbs and a pair of grips of one flat and one point face were used. The sample size was 15 mm wide by 102 mm of gauge length. The crosshead speed was set at 51 mm/min. Five specimens were tested for one sample, and the average and standard deviation were reported. A coefficient of variation of 12% for the tensile strength and 15% for the elongation to break was generally observed, which includes the variation in the material and the measurement.

Tear Strength: All Trouser tear tests were performed in accordance with ASTM D1938 in a standard environment of 50% RH and 23° C. The tear test was conducted using a SINTECH 2 operated via TESTWORK version 4.5 software with an INSTRON frame and load cell. The sample size was 25 mm wide by 75 mm. A cut of 25 mm long was first made in the center of the width using a pair of sharp scissors. Then two arms were put between two jaws to be stretched. A load cell of 2 kg and a pair of grips of flat faces were used. The crosshead speed was set at 254 mm/min. The tear strength, $P_c$, was reported by normalizing the average peak load by the thickness of the film.

Cutting Index Values were computed from the properties determined in the tensile test and the trouser tear test, according to formulas (1) and (2), shown above.

Example 1

Eastar A150® (Trademark of Eastman Chemical Company, USA) resin was converted into film by the process of melt extrusion and sequential biaxial stretching comprising the steps of melt extrusion, drafting, tentering, and heat-setting. The resin was extruded through a sheet-forming die at a temperature of 277° C. and cast onto a cooling surface at 60° C. to form a continuous cast sheet. The sheet was drafted and tentered at temperatures of 100° C. and 110° C., respectively. The cast sheet was stretched to 3.4 times its original dimensions in both the machine and transverse directions and immediately following stretching, the film was heat-set at an actual temperature of 170° C. for approximately 10 sec. The film base was subsequently annealed at 90° C. for 4 days using a general procedure described in U.S. Pat. No. 4,141,735.

Comparative Example 2

A 112 μm (nom.) thick PET (polyethylene terephthalate) film base was produced by a process of melt extrusion and sequential biaxial stretching under conditions well known to the skilled artisan (e.g., see U.S. Pat. Nos. 4,141,735 and 4,677,188). The base was subsequently annealed at 75° C. for 4 days.

Comparative Example 3

A 107 μm (nom.) thick PEN (polyethylene naphthalate) base was produced by a process of melt extrusion and sequential biaxial stretching under conditions well known to the skilled artisan (e.g., see U.S. Pat. Nos. 4,141,735 and 5,599,658). The base was subsequently annealed at 80° C. for 4 days.

Comparative Example 4

A conventional cellulose triacetate (CTA) film base used as a support for 35 mm photographic elements is a comparative sample for this invention. This film was prepared by a conventional solvent-casting process well known to the skilled artisan.

Example 5

The tongue retrieval performance of the supports in accordance with the invention and comparative examples was determined by spooling the subject film bases coated with light-sensitive silver halide emulsions in 35 mm magazines and loading them in One-Time-Use Cameras. The cameras were then placed in 55° C./50% RH chamber for 24 hours. After conditioning, the cameras were allowed to equilibrate to 23° C./50% RH for 16 hours. The film was exposed, and removed from the OTUC unit. Tongue retrieval was attempted using a KODAK ML 135 Film Extractor, Model A (manufactured by Eastman Kodak Company, Rochester, N.Y.). Cutting was attempted on a SYNTRA SPLICER (Manufactured by Gretag Imaging Corporation, Reggensdorf, Switzerland). Retrieval was tried on 10 separate samples, and was judged "acceptable" if at least 9 samples could be retrieved. Cutting was judged by attempting to cut 10 samples, and was judged "good" if at least 9 were cut. Results are shown in Table 1 below.

leader 9
cartridge spool 11
takeup spool 13
filmstrip receiving slit 15
receptacle 17
upper frame member 19
perforation 21
hollow shaft 23
drive end 25

What is claimed is:

1. A prepackaged photographic unit for consumer use that is a one-time-use camera containing a photographic film element which is pre-wound out of a cartridge housing onto a supply-side spool or into a supply-side chamber to form a supply-side roll of the film element wherein the leader of the film element is stored at the center of the supply-side roll prior to consumer use, the film element comprising a support and at least one light-sensitive sliver-halide emulsion layer, said support comprising a CHDM-containing film base having simultaneously a characteristic core set of less than 60 $m^{-1}$ according to the OTUC core-set test and a "Cuffing Index" of less than 2.0.

2. The photographic unit of claim 1 wherein the film element is provided for the camera in a 35 mm or 24 mm cartridge.

3. The photographic unit of claim 1 wherein the film base is heat-treated by an annealing step at a temperature ranging from 50° C. to Tg +15° C. for times of up to 1000 br where Tg is the glass transition temperature of unprocessed amorphous team for making the film base.

4. The photographic unit of claim 1 wherein the film base is made of a PET-based polyester material comprising one or more polyester resins, in which material the total level of repeat units derived from 1,4-cyclohexane dimethanol is 65 to 100 mol %, based on total glycol component in the material.

5. The photographic unit of claim 4 wherein the film base comprises a PET-based polyester material in which the level of repeat units derived from an acid component other than terephthalic acid or its ester is in the amount of 3 to 30 mol %, based on the total acid component.

TABLE 1

| Example No | Material | Tensile Toughness (Mpa) | Tear Strength (g/100 μm) | Cutting Index | OTUC Core-Set ($m^{-1}$) | Tongue Retrieval Acceptability | Cutting Performance |
|---|---|---|---|---|---|---|---|
| 1 | Invention EASTAR A150 | 54 | 17 | 1.4 | 41 | Yes | Good |
| 2 | Comparative APEN | 98 | 45 | 2.2 | 87 | Yes | Poor |
| 3 | Comparative APET | 156 | 104 | 4.6 | 89 | Yes | Poor |
| 4 | Comparative CTA | 23 | 25 | 1 | 138 | No | Good |

As can be seen in Table 1, the EASTAR A150-based film is the only material having both low Cutting Index and low core-set curl. It is also the only polyester sample that has cutting performance equivalent to CTA while its tongue retrieval performance is expected to surpass that of CTA because of its low core-set curl.

The invention has been described in detail with particular reference to certain preferred embodiments thereof, but it will be understood that variations and modifications can be effected within the spirit and scope of the invention.

PARTS LIST camera frame 1
film cartridge 3
filmstrip 5
cartridge housing 7

6. The photographic unit of claim 4 wherein the film base comprises a PET-based polyester material in which the total level of repeat units derived from 1,4-cyclohexane dimethanol is 65 to 95 mol %, based on total glycol component in the material.

7. The photographic unit of claim 4 wherein the level of repeat units derived from 1,4-cyclohexane dimethanol is at least 70 mol %, based on total glycol component in the material.

8. The photographic unit of claim 4 wherein the PET-based polyester material comprises a blend comprising at least two polyesters, a first polyester being a high-CHDM-modified PET polyester in which the level of CHDM-comonomer units is above about 95 mol %, and a second polyester comprising repeat units derived from 1,4-cyclohexane dimethanol, wherein the total repeat units derived from 1,4-cyclohexane dimethanol in the PET-based polyester material is at a level of 65 to 100mol % based on total glycol component in the polyester material.

9. The photographic unit of claim 8, wherein the first polyester comprises 100% of CHDM-monomer, based on the glycol component in the first polyester.

10. The photographic unit of claim 8 wherein the second polyester is a CHDM-modified PET polyester.

11. The photographic unit of claim 4 wherein the repeat units derived from 1,4-cyclohexane dimethanol is at a level of above 75 mol % based on total glycol component in the PET-based polyester material.

12. The photographic unit of claim 5 wherein the acid component other than terephthalic acid is selected from the group consisting of isophthalic acid (IPA), 1,4-cyclohexanedicarboxylic acid (1,4-CHDA), paraphenylene-dicarboxylic acid (PPDA), naphthalenedicarboxylic acid (NDA) and derivatives thereof.

13. The photographic unit of claim 5 wherein the film base comprises a PET-based polyester material comprising one or more polyester resins, in which material the total level of repeat units derived from 1,4-cyclohexane dimethanol, based on the total glycol component in the material, is 65 to 100 mol %, and wherein the level of repeat units derived from an acid component other than terephthalic acid or its ester is in the amount of 3 to 30 mol %, based on the total acid component, wherein the acid component other than terephthalic acid is selected from the group consisting of isophthalic acid (IPA), 1,4-cyclohexanedicarboxylic acid (1,4-CHDA), paraphenylenedicarboxylic acid (PPDA), naphthalenedicarboxylic acid (NDA) and derivatives thereof.

14. A packaged photographic unit, for one-time use by a consumer, containing a photographic film element and a cartridge housing wherein the film element is in the form of a supply-side roll in which the leader is at the center of the roll when the unit is provided to the consumer and wherein the film element after each exposure is capable of being incrementally drawn into the cartridge housing, said film element comprising a support and at least one light sensitive silver halide emulsion layer, said support comprising a film base simultaneously exhibiting a characteristic core set of less than 60 $m^{-1}$ according to the OTUC core-set test and a "Cutting Index" of less than 2.0, wherein the support comprises a film base of a PET-based polyester material comprising one or more polyester resins, in which material the total level of repeat units derived from 1,4-cyclohexane dimethanol is 65 to 100 mol %, based on total glycol component in the material.

* * * * *

UNITED STATES PATENT AND TRADEMARK OFFICE
CERTIFICATE OF CORRECTION

PATENT NO. : 6,931,206 B2
DATED : August 16, 2005
INVENTOR(S) : Fant et al.

It is certified that error appears in the above-identified patent and that said Letters Patent is hereby corrected as shown below:

Column 18,
Line 21, after "core-set test and a" delete "Cuffing" and replace with -- Cutting --.
Line 28, after "up to 1000" delete "br" and replace with -- hr --.

Signed and Sealed this

Thirteenth Day of December, 2005

JON W. DUDAS
*Director of the United States Patent and Trademark Office*